(12) United States Patent
Sørensen et al.

(10) Patent No.: US 9,733,112 B2
(45) Date of Patent: Aug. 15, 2017

(54) ULTRASONIC FLOW METER WITH DIGITALLY UNDER-SAMPLED FLOW MEASUREMENTS

(71) Applicant: Kamstrup A/S, Skanderborg (DK)

(72) Inventors: Jens Lykke Sørensen, Beder (DK); Paul Martin Bendixen, Åbyhøj (DK)

(73) Assignee: Kamstrup A/S, Skanderborg (DK)

( * ) Notice: Subject to any disclaimer, the term of this patent is extended or adjusted under 35 U.S.C. 154(b) by 548 days.

(21) Appl. No.: 14/361,269

(22) PCT Filed: Nov. 30, 2012

(86) PCT No.: PCT/DK2012/050440
§ 371 (c)(1),
(2) Date: May 28, 2014

(87) PCT Pub. No.: WO2013/079074
PCT Pub. Date: Jun. 6, 2013

(65) Prior Publication Data
US 2014/0318268 A1    Oct. 30, 2014

(30) Foreign Application Priority Data

Dec. 2, 2011 (EP) .................................. 11191677

(51) Int. Cl.
*G01F 1/66* (2006.01)
*G06F 17/40* (2006.01)
(Continued)

(52) U.S. Cl.
CPC .............. *G01F 1/66* (2013.01); *G01F 1/662* (2013.01); *G01F 1/667* (2013.01); *G01P 5/245* (2013.01); *G06F 17/40* (2013.01); *G06F 19/00* (2013.01)

(58) Field of Classification Search
None
See application file for complete search history.

(56) References Cited

U.S. PATENT DOCUMENTS 6,216,544 B1 * 4/2001 Adachi .................. G01F 1/662
                                                73/861.25
6,226,598 B1   5/2001 De Vanssay et al.
(Continued)

FOREIGN PATENT DOCUMENTS

CN          101398320 A      4/2009
DE     20 2011 107 060 U    10/2012
(Continued)

OTHER PUBLICATIONS

Supplementary European Search Report for EP 12 85 3865 dated Sep. 30, 2015.
(Continued)

*Primary Examiner* — Edward Cosimano
(74) *Attorney, Agent, or Firm* — Renner, Otto, Boisselle & Sklar, LLP

(57) ABSTRACT

The invention relates to a method of operating an ultrasonic flow meter by digitally sampling received signals. Acoustic wave packets are transmitted through a measuring distance in opposite directions, and the received signals are digitized at a sampling frequency being below the Nyquist-limit of two times the signal frequency of the wave packet to generate digitized under-sampled signals 31. From the digitized under-sampled signals, the difference in propagation time along the measuring distance is determined.

14 Claims, 4 Drawing Sheets

(51) Int. Cl.
*G06F 19/00* (2011.01)
*G01P 5/24* (2006.01)

(56) References Cited

U.S. PATENT DOCUMENTS

| | | | |
|---|---|---|---|
| 6,310,416 B1 | 10/2001 | Chang | |
| 6,575,044 B1* | 6/2003 | Feller | G01F 1/667 |
| | | | 73/861.27 |
| 6,584,861 B1* | 7/2003 | Jespersen | G01F 1/667 |
| | | | 73/861.18 |
| 8,104,359 B2* | 1/2012 | Wiest | G01F 1/667 |
| | | | 73/861.27 |
| 8,347,734 B2* | 1/2013 | Berger | G01F 1/662 |
| | | | 73/861.28 |
| 9,080,906 B2* | 7/2015 | Sorensen | G01F 1/667 |
| 2005/0288873 A1 | 12/2005 | Urdaneta et al. | |
| 2006/0273792 A1 | 12/2006 | Kholmovski et al. | |
| 2008/0059085 A1 | 3/2008 | Simon | |
| 2008/0292167 A1 | 11/2008 | Todd et al. | |
| 2008/0307895 A1 | 12/2008 | Zhang et al. | |
| 2010/0024570 A1* | 2/2010 | Berger | G01F 1/667 |
| | | | 73/861.27 |
| 2011/0094309 A1* | 4/2011 | Berger | G01F 1/662 |
| | | | 73/861.28 |
| 2013/0205913 A1* | 8/2013 | Sorensen | G01F 1/667 |
| | | | 73/861.29 |

FOREIGN PATENT DOCUMENTS

| | | |
|---|---|---|
| EP | 2 178 738 | 4/2010 |
| EP | 2 383 550 | 11/2011 |
| WO | WO 97/14936 A1 | 4/1997 |
| WO | WO 01/33700 A1 | 5/2001 |
| WO | WO 2008/082807 A1 | 7/2008 |
| WO | WO 2009/015910 A1 | 2/2009 |
| WO | WO 2013/004320 A1 | 1/2013 |

OTHER PUBLICATIONS

International Search Report for PCT/DK2012/050440 dated Feb. 18, 2013.

* cited by examiner

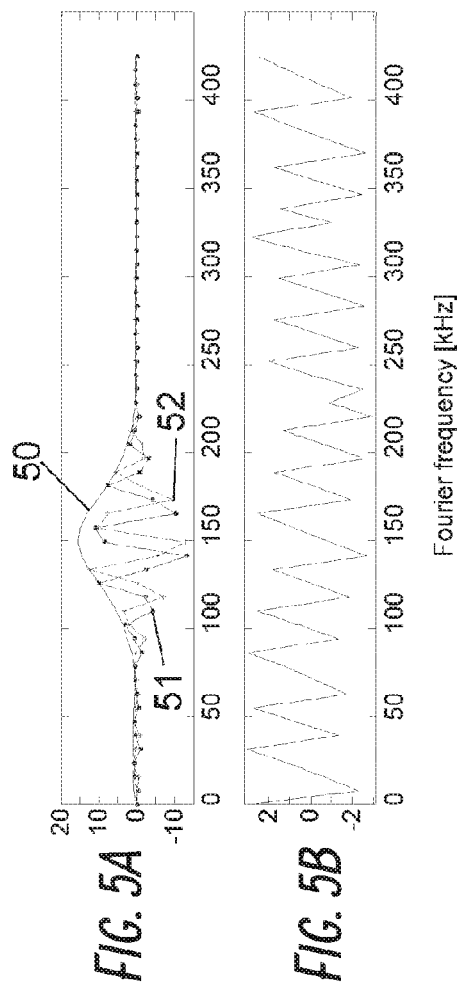
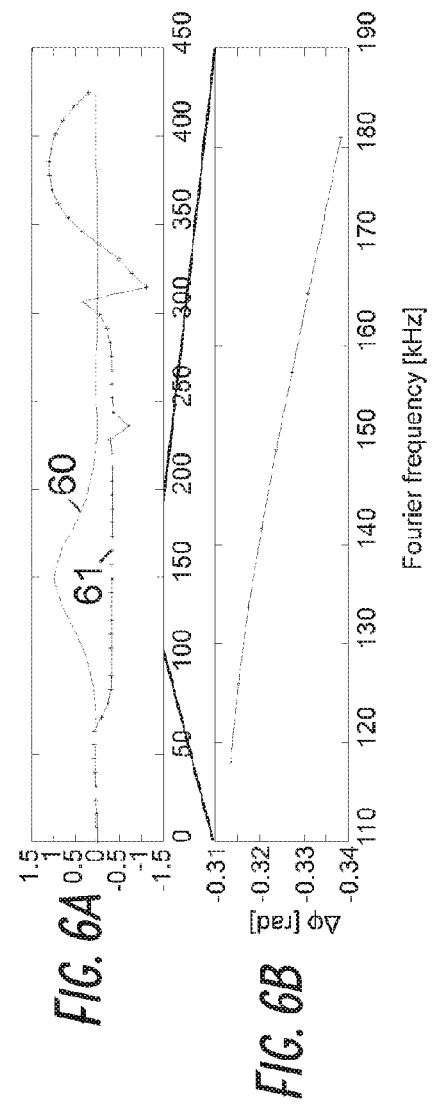

ULTRASONIC FLOW METER WITH DIGITALLY UNDER-SAMPLED FLOW MEASUREMENTS

CROSS REFERENCE TO RELATED APPLICATIONS

This application is a U.S. National Phase Application of PCT International Application Number PCT/DK2012/050440, filed on Nov. 30, 2012, designating the United States of America and published in the English language, which is an International Application of and claims the benefit of priority to European Patent Application No. 11191677.1, filed on Dec. 2, 2011. The disclosures of the above-referenced applications are hereby expressly incorporated by reference in their entireties.

FIELD OF THE INVENTION

The invention relates to an ultrasonic flow meter, and in particular to a method of operating the ultrasonic flow meter by digitally sampling received signals.

BACKGROUND OF THE INVENTION

In a consumption ultrasonic flow meter of the transit time type, the determination of the consumption is based on a flow rate measurement of the consumed medium. The flow rate measurement is based on measuring a transit time difference between counter-propagating ultrasonic waves in the medium flow. This time difference is normally performed by measuring the travel time of a wave packet travelling through a measurement distance of the medium. On a general level, the time measurement is performed by starting a clock when the wave packet is emitted from one transducer, and stopping the clock when the wave packet is received at the other transducer. The typical transit times of the ultrasonic signals through the medium are very short, and therefore the transit times, or at least the time differences between travel times of counter propagating wave packets, need to be measured with a very high accuracy. Due to this high accuracy, the specific implementation of the time measurements is critical for the system performance. As a consequence a number of time measurement implementations have been devised in the art.

In U.S. Pat. No. 6,226,598 B 1, the time measurement is based on digitizing the received signal, and performing digital signal processing on the received digitized signal to identify characteristic signal features in order to determine a specific signal feature from which an arrival time can be determined. The specific signal feature is in the form of a zero-crossing of the received wave package.

WO 97/14936 A1 disclose a similar methodology where the received signal is digitized and digital signal processing is used to extract a specific signal feature from which an arrival time can be determined. The specific signal feature is slopes of the waveform of the received wave package.

Signal transformation from the transmitter to the receiver can make it challenging to extract the parameters which are important to the flow rate calculation. The transformation is a result of filtering by the various components involved in the flow measurement. In particular, the electro-mechanical parameters of the piezo-electrical transducers normally lead to a dramatically change of the signal shape. Moreover, transducer characteristics can vary from unit to unit, and change over time as a consequence of aging, temperature variations, etc. resulting in that the shape and frequency content of the received signal can vary somewhat during the life span of the meter. Hence it would be advantageous to acquire a digital representation of the signal in order to utilize the tools available in Digital Signal Processing (DSP).

To obtain a detailed signal representation in order to make a precise time-of-arrival determination, a high-speed analogue-to-digital converter ADC may be used. High-speed ADCs are however expensive and consume a relative high amount of power, and therefore jeopardize the battery life time of battery powered meters, and becomes an important component for the price level of the meter.

SUMMARY OF THE INVENTION

It would be advantageous to achieve alternative methods of operating an ultrasonic flow meter which achieves at least one of: facilitates a cost-efficient flow meter, can be operated in an energy efficient manner to sustain long-life battery power, and which supports operation for many years with no or only little development in the accuracy of the time measurements. It would also be advantageous to achieve a method of operating an ultrasonic flow meter which is robust to variations of the electro-mechanical characteristic of the utilized components. In general, the invention preferably seeks to mitigate, alleviate or eliminate one or more disadvantages of flow meters of the prior art, singly or in any combination.

In a first aspect of the invention, there is provided a method of operating an ultrasonic flow meter to measure a flow rate of a fluid, the ultrasonic flow meter comprises:
  at least two ultrasonic transducers arranged for transmission and receipt of ultrasonic signals in opposite directions across a measuring distance;
  a generator circuit for controlled generation of an acoustic wave packet to be transmitted from the at least two ultrasonic transducers;
  a receiver circuit for receiving the transmitted signals from the at least two ultrasonic transducers;
  a processing means for digital signal processing;
wherein the method comprises:
for at least two signal paths along generally opposite directions:
  generating the acoustic wave packet to be output into the measuring distance at a first of the at least two ultrasonic transducers, the wave packet being generated at a signal frequency;
  receiving the acoustic wave packet at a second of the at least two ultrasonic transducers as a received signal;
  digitizing the received signal at a sampling frequency below the Nyquist-limit to generate a digitized received under-sampled signal for the given signal path;
  from at least two digitized received under-sampled signals along generally opposite directions, determine the difference in propagation time along the measuring distance.

The inventors of the present invention have realized that by proper signal treatment of the received signal, it is feasible to determine the difference in propagation time in a situation with an under-sampled received signal with a sufficient accuracy, even without reconstructing the received signal. By under-sampling the received signal, the performance demands of the ADC can be loosened, leading to a cheaper component which requires less power, than an ADC used in the prior art. By not reconstructing the received signal, but determining the difference in propagation time based on signal treatment of the digitized received under-sampled signals, fewer samples and thereby fewer instructions are needed to be dealt with by the digital signal processor, and thereby reducing the performance demands also of the micro-processor that performs the digital signal processing.

The invention thus provides an alternative to known solutions, in that the difference in propagation is determined based on an under-sampled digital signal, and not on a fully sampled or reconstructed under-sampled signal. Signal frequencies used in ultrasonic flow meters are typically in the 0.5 to 2 MHz range. The Nyquist sampling theorem, also sometimes referred to as the Nyquist-Shannon theorem, states that the sampling rate must be at least twice the ultrasonic frequency, but in practise each cycle should be sampled at least 4-16 times in order to obtain a good representation of the signal. High speed ADCs capable of such performance are expensive, and consume a relative high amount of power. The present invention devices a solution to use standard off-the-shelf components with a limited power consumption level and relative low price in the flow meter, since an ADC with a sampling frequency in the range of the signal frequency can be used.

In embodiments, the sampling frequency may be below two times the signal frequency, and even below the signal frequency.

In a second aspect, the invention relates to an ultrasonic flow meter for operating the method of the first aspect.

In embodiments, the ultrasonic flow meter may be or may be part of a charging consumption meter, e.g. a water meter, gas meter, heat meter, cooling meter or energy meter. The consumption meter may be used in connection with district heating or district cooling. The consumption meter may be a legal meter, i.e. a meter which is subdued to regulatory demands. Such regulatory demands may be demands to the precision of the measurements.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which

FIGS. 5A and 5B show the fast Fourier transform of the signal of FIG. 3B;

FIGS. 6A and 6B shows the phase difference together with the normalized modulus of the Fourier amplitude of the received signals;

DESCRIPTION OF EMBODIMENTS

Figure 1:
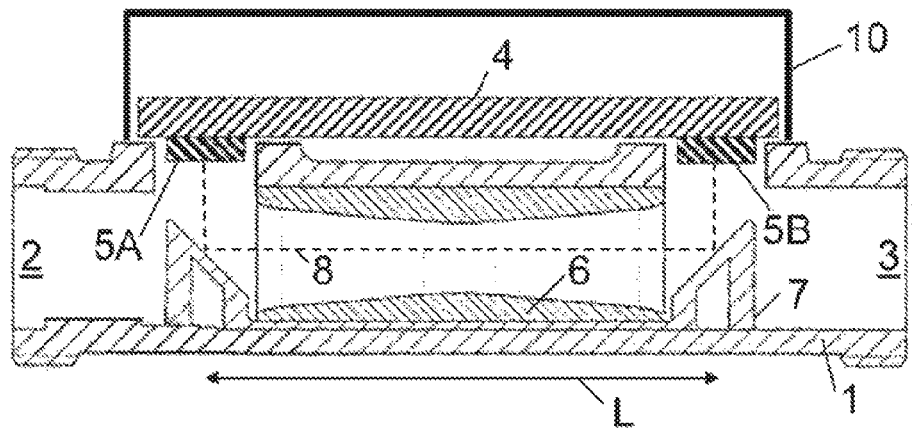
FIG. 1 illustrates a schematic cross-sectional view of elements of an ultrasonic flow meter.

FIG. 1 illustrates a schematic cross-sectional view of elements of an embodiment of an ultrasonic flow meter. The flow meter comprises a housing 1, or flow tube, with an inlet 2 and outlet 3. The flow meter further comprises an electronic unit 4 comprising or connected to ultrasonic transducers 5A, 5B. The flow meter comprises a measuring distance L, defined by a measuring insert 6. In general, however, the measuring distance need not be defined by an insert, but could be an integral part of the housing 1, such as a through-going flow channel of the housing. The ultrasonic transducers 5A, 5B for generating and detecting ultrasonic signals are placed so that the generated signals can be introduced into the measuring distance. In the illustrated embodiment, reflectors 7 are placed so that the signals 8 emitted from each of the transducers are directed along the measuring distance, and onto the opposite transducer for detection.

Signals propagating downstream propagate faster than signals propagating upstream, and the flow rate can be determined by measuring difference in arrival time of the emitted signals at the other transducers. The determination of the flow rate, as well as the outputting of the flow rate is done by the electronic unit 4. The electronic unit at least comprises a measurement circuit operationally connected to the ultrasonic transducers and arranged to determine a value representing the flow rate. The ultrasonic transducers and the measuring circuit may in embodiments be provided as a unit adapted to be mounted onto the housing. Additionally, a consumption meter is normally equipped with a calculator unit which based on the value representing the flow rate is adapted to calculate a consumed quantity, and optionally additional quantities. The calculator unit may be a separate unit or a unit combined with the measuring circuit for operating the transducers. The electronic unit may additionally comprise such elements as a transmitter, e.g. in the form of a radio transmitter, as well as a power supply, e.g. in the form of a battery or a wired connection, as well as other components. Such elements may be provided within the casing 10, or as part of a separate unit connected to the flow meter.

The illustrated ultrasonic flow meter comprises a first transducer 5A positioned at one end of the measuring distance and a second ultrasonic transducer 5B positioned at the other end of the measuring distance. In general, more transducers may be placed at each end. Moreover, three or more reflector units may be used for directing the ultrasonic signals through the measuring distance. In other embodiments, the transducers are placed so that they oppose each other, so that reflectors are not needed. In such embodiments, the line-of-sight of the transducers may be along the flow direction or may be angled with respect to the flow direction.

Embodiments of the present invention are directed to ultrasonic flow meters which are based on the time-of-flight principle. In such a flow meter, an estimate of the fluid flow velocity, v, can be obtained from the expression $$v = \frac{L\Delta t}{2t_0^2} \qquad \text{Eq. (1)}$$

Here L is the physical distance travelled by the pulses, $\Delta t$ is the difference in time-of-flight and $t_0$ is the time of flight in the absence of any flow velocity, also referred to as the flow-free time-of-flight (FFTOF). An accurate estimation of the flow velocity requires both $\Delta t$ and $t_0$ to be measured accurately, while L is known. In practice it is more feasible to measure $t_0$ as: $t_0=(t_1+t_2)/2$, and the time difference as: $\Delta t=t_1-t_2$.

Figure 2:
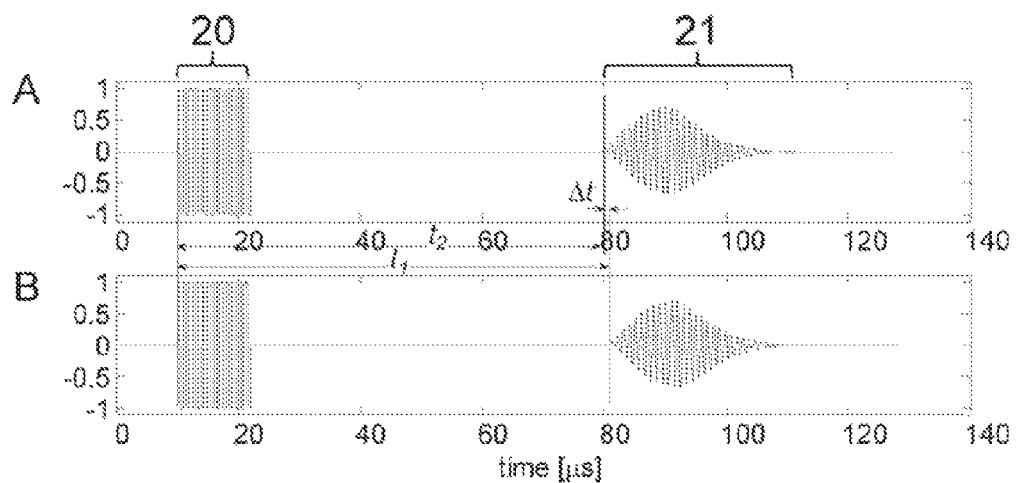
FIG. 2 illustrates an example of the transmitted signal in waveform A and the received signal in waveform B.

FIG. 2 illustrates an example of the transmitted signal 20 and the received signal 21 for the two situation downstream signal propagation (waveform A) and upstream signal propagation (waveform B), as well as the time difference $\Delta t$.

In agreement with Eq. 1, to determine the flow rate, the two parameters, $t_0$ and $\Delta t$, must be extracted from the received signals. The parameter $t_0$ is less critical from an accuracy point-of-view, and can be determined from processing of the received signal by use of a method of the prior art, such as envelope peak detection, envelope maximum slope detection, Fourier analysis etc. $\Delta t$ is more critical due to the high requirement of the accuracy. The present invention deals with the determination of $\Delta t$, whereas $t_0$ can be determined by a method known in the art.

The received signal 21 is an oscillation rather than an impulse, and the time difference measurement can be done by performing a phase difference measurement, where the phase difference, $\Delta\phi$, is related to the time difference as: $\Delta t=\Delta\phi/\omega$, where $\omega_0$ is the angular frequency of the transmitted signal at the centre frequency.

Figure 3A:
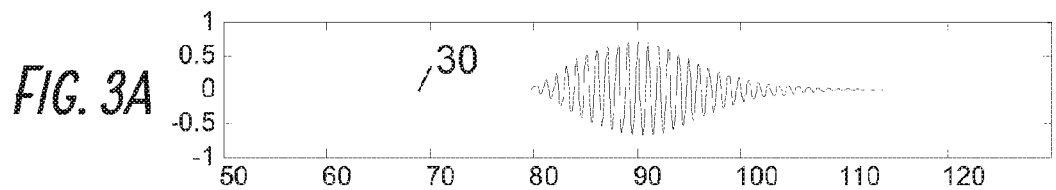
FIG. 3A shows an example of a received signal at a high sample rate.
Figure 3B:
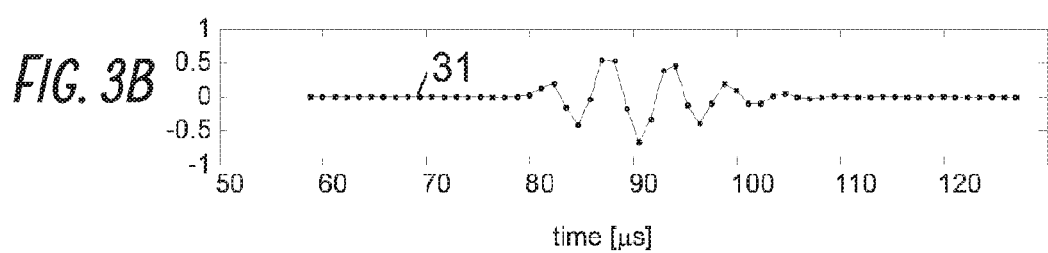
FIG. 3B shows the same signal as FIG. 3A in an under-sampled representation.

When sampling the received signal below the Nyquist limit, i.e. the received signal is under-sampled, in principle too little information is available to be processed. FIG. 3A shows an example of a received signal 30 at a high sample rate, and FIG. 3B shows the same signal as FIG. 3A in an under-sampled representation 31. For both signals, the angular frequency of the transmitted signal, $\omega_0/2\pi=1.0$ MHz, whereas the sampling frequency of the received signal 30 in FIG. 3A is $\omega_S/2\pi=16$ MHz and the sampling frequency of the received signal 31 in FIG. 3B is $\omega_S/2\pi=0.85$ MHz.

In the present invention, the difference in propagation time is determined from the digitized received under-sampled signal 31, and not from a fully sampled signal 30, or from a reconstructed signal. A reconstructed signal reconstructs a fully sampled representation of the received signal from a received under-sampled signal.

In an embodiment, the difference in propagation time along the measuring distance is determined by performing a correlation between the at least two digitized received under-sampled signals along generally opposite directions, and determine the maximum correlation between the two signals. This is illustrated in FIG. 4A to 4C.

Figure 4A:
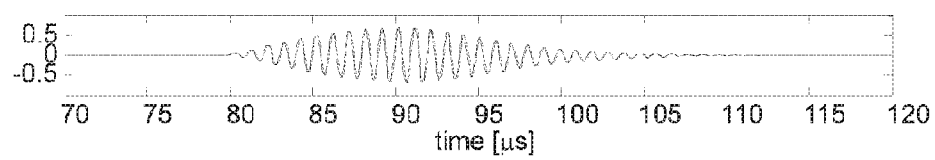
FIGS. 4A to 4C illustrate signals involved in determining the difference in propagation time by performing a correlation between digitized received signals.

FIG. 4A shows the fully sampled signals, as in FIG. 3A for: $\omega_0/2\pi=1.0$ MHz and $\omega_S/2\pi=16$ MHz, for the two situations of the signals travelling along the flow and against the flow.

Figure 4B:
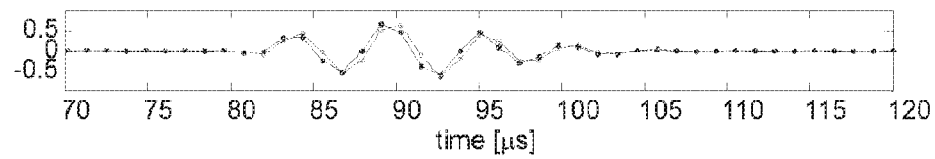

FIG. 4B shows the under-sampled representation of the signals of FIG. 4A with $\omega_S/2\pi=0.85$ MHz.

Figure 4C:
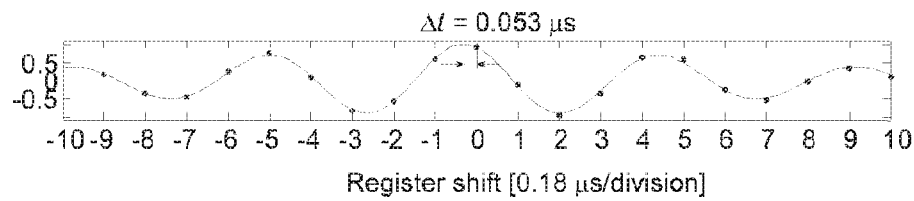

FIG. 4C illustrates the correlation function calculated from the under sampled signals of FIG. 4B.

The time difference can be inferred by calculating the correlation function between up- and downstream signals:

$$C_{12}(k)=V^{-1}\Sigma_{j=1}^{N}s_1(j)s_1(j-k) \qquad \text{Eq. (2)}$$

Where N is the number of samples, $s_1(j)$ and $s_2(j)$ are the j'th samples of the two received signals and V is a normalization factor given by:

$$V=N^{-1}\sqrt{\Sigma_{j=1}^{N}[s_1(j)]^2\Sigma_{j=1}^{N}[s_2(j)]^2} \qquad \text{Eq. (3)}$$

The shift from zero of the maximum of the correlation function can readily be converted into $\Delta t$. The maximum can be found from a parabolic approximation, finding zero crossings or by fitting to a model expression which is shown as the full curve in FIG. 4C.

In an embodiment, the difference in propagation time along the measuring distance is determined by determining the phase-shifts between the digitized received signals along the generally opposite directions.

The phase shift difference may be determined by perform a digital Fourier transform or a fast Fourier transform on the under-sampled signal. FIGS. 5A and 5B show the result of performing a fast Fourier transform of the signal of FIG. 3B.

FIG. 5A shows the resulting spectrum in terms of the modulus 50, and the real 51 and imaginary parts 52 of the complex Fourier amplitudes as function of frequency. FIG. 5B shows the corresponding phase, in radians, as function of frequency. This phase can be calculated for both the up- and downstream signals, and the difference, which is $\Delta\phi$, can be formed.

FIG. 6A shows the phase difference 61, $\Delta\phi$, in radians together with the normalized modulus of the Fourier amplitude 60. By analyzing the Fourier amplitude curve, a peak in the Fourier amplitudes of the transformed signal can be identified. If more than one peak is present, the peak with the largest amplitude may be selected. By averaging over the $\Delta\phi$ values, for frequencies within this peak around the base band frequency (FIG. 6B), the time difference can be extracted as $\Delta t=P\Delta\omega/2\pi$. Here P is the period of the $\omega_0$ oscillation, which is 1 µs for the present example. A time difference of $\Delta t=-0.052$ µs is obtained. The values may e.g. be selected as the values which are within the top 50% of the peak, or by other suitable peak selection criteria.

The Fourier transform approaches have the advantage that changes in dampening rate and resonance frequencies of the transducers can be readily tracked over time and compensated for in the flow calculation.

In a further embodiment, the phase difference is determined based on the application of a digital Hilbert transform on the up- and downstream signals. From the transformed signals, the quadratures of the signals can be determined, and from these the phase difference can be calculated. Denoting the two signals $s_1$ and $s_2$, the mutual orthogonal signal quadratures, $q_1$, $p_1$, $q_2$ and $p_2$ are set as:

$$q_1=s_1\ p_1=H[s_1]$$

$$q_2=s_2\ p_2=H[s_2] \qquad \text{Eq. (4)}$$

Here $H[s_{1,2}]$ denotes the Hilbert transform of the up- and downstream signals respectively. From quadratures, the phase difference is calculated as:

$$\Delta\varphi = \tan^{-1}\frac{q_1p_2 - p_1q_2}{q_1q_2 + p_1p_2} \qquad \text{Eq. (5)}$$

The phase difference can also be calculated in the frequency space by forming complex signal representations of the under-sampled signal by digital Fourier transformations along the two directions to provide the real part and the imaginary parts. The signal quadratures, $q_1$, $p_1$, $q_2$ and $p_2$ are set so that $q_1$ and $q_2$ are the real part of the resulting Fourier transforms, whereas $p_1$ and $p_2$ are the imaginary parts. The phase difference is calculated using Eq. (5).

In a further embodiment, the iterative procedure known as the CORDIC (COordinate Rotation on a DIgital Computer) algorithm can be used to replace the inverse tangent function of Eq. 5. This has the advantage that a computationally simple iterative procedure is performed instead of the much more complicated inverse tangent function call. The general principle behind the algorithm is to form the vector in the complex plane representing the signal, s=[q, p]. Via a sequence of consecutive rotations in the complex plane, going through increasingly smaller angles, the vector s is transformed to become parallel to the real axis. The angles through which the vector is rotated are given by $\alpha_k = \tan^{-1}(2^{-k})$, where k={0, 1, . . . , n−1} and n is the number of iterations determined by the desired accuracy of the phase angle determination. Starting with the vector $[q_0, p_0]$ determined by the sampled signal the direction of rotation in each iteration step, k, is determined by the sign of $p_{k-1}$. The iteration is terminated when $p_k$ is sufficiently small and the phase angle can then be calculated as:

$$\Delta\phi = \Sigma_{k=0}^{n-1} \sigma_k \alpha_k \qquad \text{Eq. (6)}$$

Here $\sigma_k = \{-1, 1\}$ is a register keeping track of the direction of rotation. The CORDIC also returns the magnitude of the signal vector s. This will be given by $q_n$, that is, the value of q after the CORDIC has converged.

In another embodiment, the signal quadratures, $q_1$, $p_1$, $q_2$ and $p_2$ of Eq. (4) are used to form complex signal representations with the digitized received under-sampled signals $q_1$, $q_2$ as the real part, and a digital Hilbert transformations $p_1$, $p_2$ as the complex part for the received signals along the two directions. Additionally function sets, typically in the form of basis sets, are pre-selected to represent the digitized received under-sampled signals. A number of function sets which may serve as basis sets are known to the skilled person. The complex signal representations are correlated with the pre-selected function sets to select function sets to represent the digitized received under-sampled signals. Typically function sets which have maximal correlation with the complex signal representations are selected. The difference in propagation time is determined based on the phase shift between the selected function sets.

The accuracy of the measurements can be improved by averaging the determined time difference obtained by one of the above methods over a number of measurements, such as 4 to 10 measurements. In an averaging process, advantage is taken of the 'natural' noise level which is always present in an electro-mechanical system. However, the 'natural' noise level may not be enough to remedy the coarseness of the quantization when under-sampling. In this case artificial noise can be added. This could for instance be introduced by consecutive time shifts of the transmitted signal by fractions of a period, so that the launch time of the transmission is selected from the set $t_0 \in \{0, P/n, 2P/n, \ldots, (n-1)P/n\}$, where $P = 2\pi/\omega_0$ is the period of the transmitted oscillation and n is the number of different launch times into which the period has been divided. The addition of artificial noise has the advantage that it can be compensated for in the digital signal processing of received signal, since the working precision of the calculations performed by far exceeds the timing resolution and bit depth of the ADC. Hence, the added noise will not contribute to a loss of precision of the meter. In addition, the amplitude, the phase or the number of oscillations of the transmitted signal can be varied, resulting in a similar smearing out of the quantization, which can be compensated in the digital signal processing, resulting in better overall resolution when averaging over several measurements.

Figure 7:
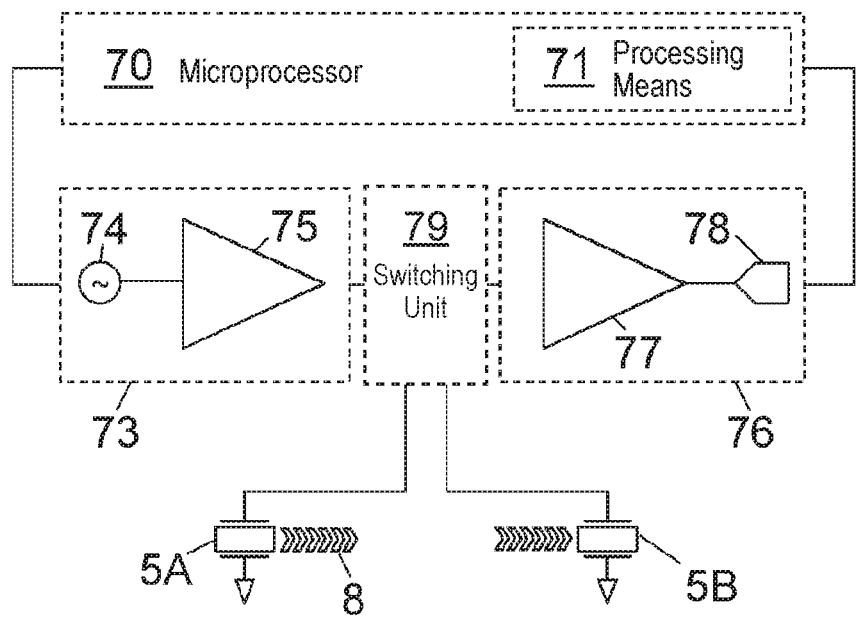
FIG. 7 illustrates general elements of an ultrasonic flow meter in accordance with embodiments of the present invention.

FIG. 7 illustrates elements of an ultrasonic flow meter in accordance with embodiments of the present invention. The ultrasonic flow meter comprises two ultrasonic transducers 5A, 5B arranged for transmission and receipt of ultrasonic signals 8 in opposite directions across a measuring distance. While only two transducers are shown, more may be present in a given flow meter.

The ultrasonic transducers are connected to a generator circuit 73 for controlled generation of an acoustic wave packet to be transmitted from the at least two ultrasonic transducers. The generator circuit may comprise a signal source 74 and amplification means 75. Any suitable generator circuit may be used.

The ultrasonic transducers are moreover connected to a receiver circuit 76 for receiving the transmitted signals from the at least two ultrasonic transducers. The receiver circuit may comprise an amplifier 77 and an ADC 78 for converting the received analogue amplified signal to a digitized signal for further processing. In embodiments, the ADC may be integrated as part of the micro-processor 70 instead of being a separate component of the receiver circuit 76.

The generator circuit 73, the ultrasonic transducers 5A, 5B and the receiver circuit 76 may be electrically connected in any suitable way as is known in the art. They may even form part of the same circuit. In the illustrated figure, a switching unit 79 is shown which couple in and out the ultrasonic transducers to the respective circuits 73, 76. While a switching unit is commonly used in the art, embodiments exist which do not use switches.

Furthermore, the ultrasonic flow meter may comprise a digital micro-processor 70 comprising a processing means 71 for digital signal processing of the digitized signals. The digital micro-processor may be implemented as a central processing unit which in addition to performing the digital signal processing also controls the generator circuit and other computational tasks. Moreover, the digital micro-processor may comprise or may be connected to a clock unit for providing a system clock, which is capable maintaining the time-keeping tasks, including keeping track of the timing aspects of the generator circuit and the digital sampling of the received signals.

Figure 8:
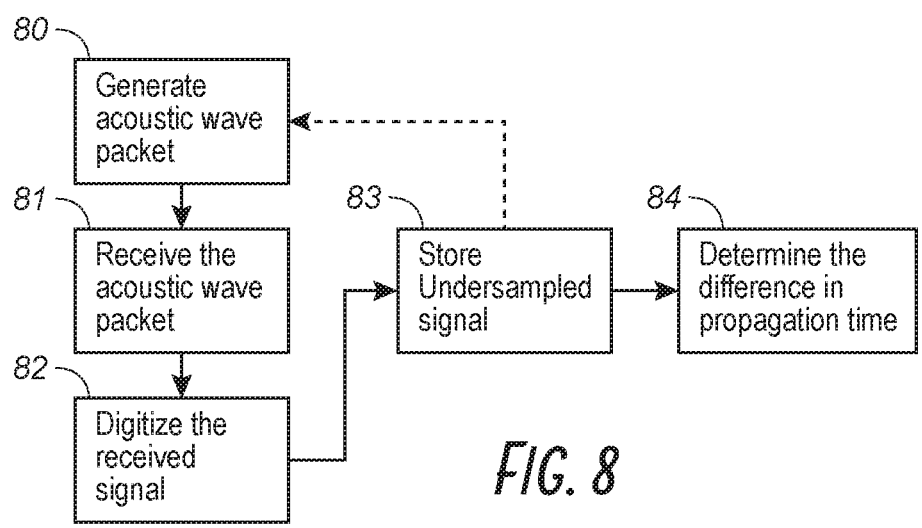
FIG. 8 shows a general flow diagram for illustrating general steps of the method in accordance with embodiments of the present invention.

FIG. 8 shows a general flow diagram for illustrating general steps of the method in accordance with embodiments of the present invention.

In a first step 80, an acoustic wave packet is generated by an ultrasonic transducer to be output into the measuring distance and travel along the measuring distance until it reaches the other ultrasonic transducer. This is performed by connecting the generator circuit 73 to the generating transducer and operating the generator circuit.

In a second step 81, the acoustic wave packet is received at a second of the at least two ultrasonic transducers as a received signal. This is performed by connecting the receiver circuit 76 to the receiving transducer and detecting the received signal.

In a third step 82, the received signal is digitized at a sampling frequency below the Nyquist limit to generate a digitized received under-sampled signal for the given signal path. The digitized received under-sampled signal being stored 83.

To obtain a signal for a counter propagating signal path, the operation of the transducers is reversed and the steps 80-82 are performed again.

Once signals have been measured for the desired paths, i.e., typically one along the flow direction and one against the flow direction, the difference in propagation time is determined in step 84 in accordance with any one of the embodiments of the present invention.

While the invention has been illustrated and described in detail in the drawings and foregoing description, such illustration and description are to be considered illustrative or exemplary and not restrictive; the invention is not limited to the disclosed embodiments. The scope of the present invention is to be interpreted in the light of the accompanying claim set.

We claim:

1. A method of operating an ultrasonic flow meter to measure a flow rate of a fluid comprising:
   providing an ultrasonic flow meter that comprises:
   at least two ultrasonic transducers arranged for transmission and receipt of ultrasonic signals in opposite directions across a measuring distance;
   a generator circuit for controlled generation of an acoustic wave packet to be transmitted from the at least two ultrasonic transducers;
   a receiver circuit for receiving the transmitted signals from the at least two ultrasonic transducers;
   a digital signal processor;
   and, for at least two signal paths along generally opposite directions:
   generating the acoustic wave packet to be output into the measuring distance at a first of the at least two ultrasonic transducers, the wave packet being generated at a signal frequency;
   receiving the acoustic wave packet at a second of the at least two ultrasonic transducers as a received signal;
   digitizing the received signal at a sampling frequency below the Nyquist-limit to generate a digitized received under sampled signal for the given signal path; and
   from at least two digitized received non-reconstructed under-sampled signals along generally opposite directions, determining the difference in propagation time along the measuring distance.

2. The method according to claim 1, wherein the difference in propagation time along the measuring distance is determined by performing a correlation between the at least two digitized received under-sampled signals along generally opposite directions, and determining the maximum correlation between the at least two signals.

3. The method according to claim 1, wherein the difference in propagation time along the measuring distance is averaged over a number of measurements obtained by time-shifting the transmitted signal relative to a system clock.

4. The method according to claim 1, wherein the difference in propagation time along the measuring distance is averaged over a number of measurements obtained by phase-shifting the transmitted signal relative to a system clock.

5. The method according to claim 1, wherein the difference in propagation time along the measuring distance is averaged over a number of measurements obtained by alternating between different amplitude levels of the transmitted signal.

6. The method according to claim 1, wherein the difference in propagation time along the measuring distance is averaged over a number of measurements obtained by varying the number of oscillations of the transmitted signal, created by the generator circuit.

7. The method according to claim 1, wherein the difference in propagation time along the measuring distance is determined by determining the phase-shifts between the digitized received under-sampled signals along the generally opposite directions.

8. The method according to claim 7, wherein a digital Hilbert transformation is performed on the digitized received under-sampled signals along the at least two directions, and wherein the phase difference is derived from the orthogonal quadratures of the signals.

9. The method according to claim 7, wherein complex signal representations are formed by digital Fourier transformations of the digitized received under-sampled signal along the at least two directions to provide the real part and the imaginary part, and wherein the phase difference is derived from the orthogonal quadratures of the signals.

10. The method according to claim 7, wherein complex signal representations are formed with the digitized received under-sampled signal as the real part, and a digital Hilbert transformation as the imaginary part for the digitized received under-sampled signals along the at least two directions, and wherein each complex signal representation is correlated with a pre-selected function set to select function sets to represent the digitized received under-sampled signals, and determining the difference in propagation time by determining the phase shift between the selected function sets.

11. The method according to claim 7, wherein the phase-shift between the digitized received under-sampled signals along the generally opposite directions is derived by use of a Coordinate Rotation on a Digital Computer (CORDIC) algorithm.

12. The method according to claim 7, wherein the digitized received under-sampled signals are Fourier transformed, and for each signal, the phase of the transformed signal is determined, and the phase difference is determined as the difference in phases of the transformed signal along the at least two directions.

13. The method according to claim 12, wherein a peak in the Fourier amplitudes of the transformed signal is identified, and wherein the phase difference is averaged over frequencies within this peak.

14. An ultrasonic flow meter arranged to measure a flow rate of a fluid, the flow meter comprising:
   at least two ultrasonic transducers arranged for transmission and receipt of ultrasonic signals in opposite directions across a measuring distance;
   a generator circuit for controlled generation of an acoustic wave packet to be transmitted from the at least two ultrasonic transducers;
   a receiver circuit for receiving the transmitted signals from the at least two ultrasonic transducers; and
   a digital signal processor;
   wherein, for at least two signal paths along generally opposite directions, the flow meter is configured to:
   generate the acoustic wave packet to be output into the measuring distance at a first of the at least two ultrasonic transducers, the wave packet being generated at a signal frequency;
   receive the acoustic wave packet at a second of the at least two ultrasonic transducers as a received signal;
   digitize the received signal at a sampling frequency below the Nyquist-limit to generate a digitized received under sampled signal for the given signal path; and
   from at least two digitized received non-reconstructed under-sampled signals along generally opposite directions, determine the difference in propagation time along the measuring distance.

* * * * *